July 15, 1969   A. P. KELLEY   3,455,182
HELICOPTER LIFT AUGMENTATION MEANS
Filed April 12, 1967
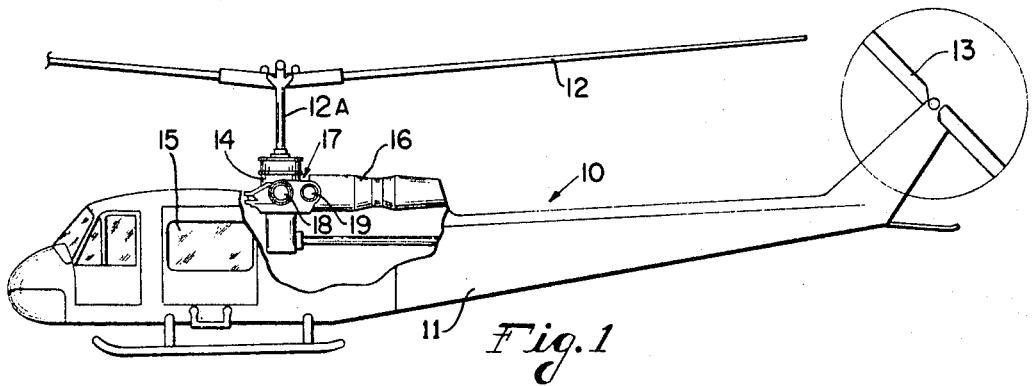
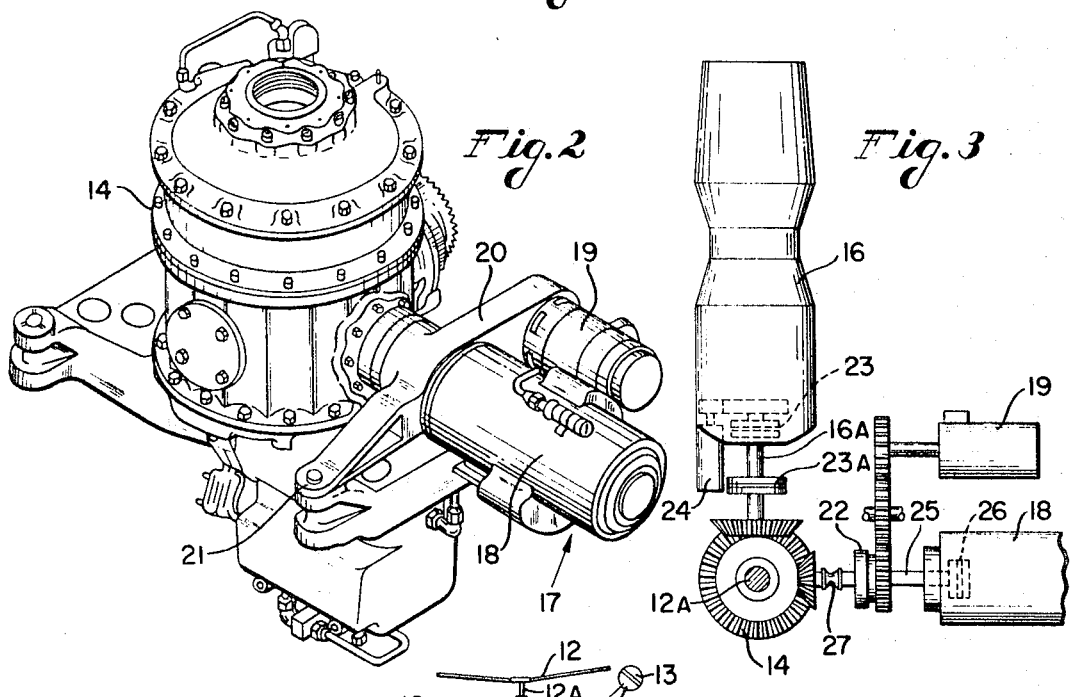
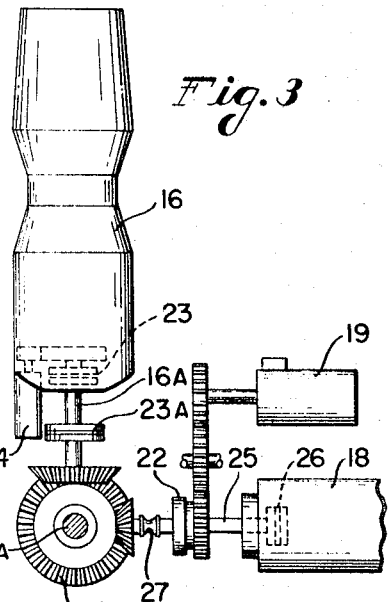
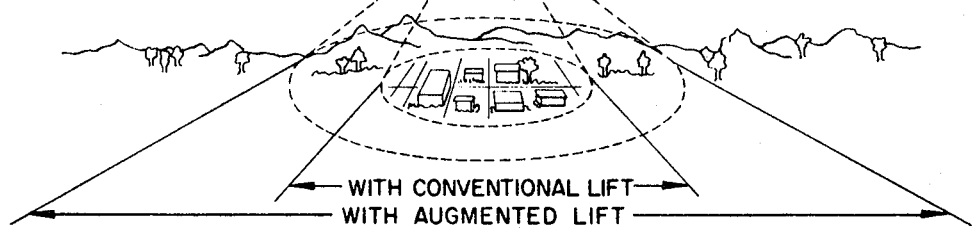
INVENTOR.
ARCHIBALD P. KELLY
BY
*Herschel C. Omohundro*
ATTORNEY United States Patent Office
3,455,182
Patented July 15, 1969

3,455,182
HELICOPTER LIFT AUGMENTATION MEANS
Archibald P. Kelley, Scottsdale, Ariz., assignor to The Garrett Corporation, Los Angeles, Calif., a corporation of California
Filed Apr. 12, 1967, Ser. No. 630,306
Int. Cl. F16h 37/06; B64c 27/04, 27/06
U.S. Cl. 74—661                    4 Claims

ABSTRACT OF THE DISCLOSURE

A helicopter lift augmentation means having an auxiliary engine of relatively low horsepower selectively connected with the usual main rotor drive to supplement the main propulsion engine torque during take-off, to provide emergency lift power upon main propulsion engine failure, to drive the generator and provide electric power when the main propulsion engine is inactive, to reduce the installed battery capacity requirement, and to improve main engine starting capability.

Summary

This invention relates generally to aircraft and more particularly to the helicopter type wherein lift forces for take-off and sustained flight are provided by a large bladed main rotor mounted for rotation in a generally horizontal plane above the body of the craft. Still more particularly, the invention relates to means for supplying auxiliary power to augment the lift provided by the conventional main propulsion engine under certain phases of aircraft operation and to provide an emergency lifting force and auxiliary power under other phases of operation.

Helicopter lift augmentation devices may be of two types, the first being supplemental lift devices and the second being main rotor energy augmentation. The supplemental lift devices include direct lift engines, tip-turbine-driven fans, mechanically driven fans, vertically mounted turboprop engines, and rocket thrusters of solid or liquid propellant types. These supplemental lift devices are undesirable because they are less efficient than the helicopter rotor and their thrust specific fuel consumption is much greater. The fuel weight alone required by such devices imposes prohibitive penalties.

Main rotor energy augmentation may be secured by adding thrusters at the rotor tips or by supplying torque directly at the main rotor transmission. The use of thrusters at the rotor tips is objectionable since the high centrifugal acceleration at the tips may cause severe mechanical and flight safety problems in the event of the uncompensated loss of one tip thruster or a slight unbalance from any cause. In view of the objections to the other forms of lift augmentation, the most desirable appears to be one in which supplemental torque is applied at the permanently installed rotor drive transmission.

An object of this invention is to provide a lift augmentation system having an auxiliary engine of relatively low horsepower and means for selectively connecting it with the usual helcopter lift-providing equipment to augment the main rotor torque whereby the craft will be able to take off more rapidly or under an overloaded condition, and in the event of a main propulsion engine failure to descend at a slower rate as well as increase the rotor stored energy available to arrest the descent prior to ground contact. The system also provides for quicker main propulsion engine starting with lighter weight batteries and for the generation of electrical power on the ground while the main propulsion engine is inactive.

Another object is to provide an auxiliary power system which will give the helicopter a self-contained starting capability without the addition of appreciable complication.

Other objects and advantages will become apparent from the following description and accompanying drawing of one adaptation of the present invention.

The drawings

FIG. 1 is a schematic view of a helicopter provided with the lift augmentation means forming the subject matter of the present invention;

FIG. 2 is a perspective view of a transmission case assembly used in the helicopter of FIG. 1, this transmission being provided with the lift augmentation means;

FIG. 3 is a schematic view illustrating the main propulsion engine and auxiliary power unit together with the transmission through which power is supplied to the main rotor of the helicopter; and FIG. 4 is a diagrammatic view illustrating the increase in available landing area provided by the lift augmentation means.

Description

Referring more particularly to the drawings, a helicopter to which the invention has been applied is indicated generally by the numeral 10. This helicopter includes a fuselage 11, a main rotor or flight sustaining propeller 12, and a tail rotor 13. The latter rotor is provided to resist rotation of the fuselage in the air due to the torque applied to the main rotor.

The helicopter is substantially conventional in character, having the usual vertical main shaft 12A projecting from the transmission 14 which is mounted on the helicopter frame immediately behind the passenger compartment 15. This transmission is connected by a main pinion shaft 16A with a gas turbine engine 16 constituting the main propulsion device of the helicopter.

The lift augmentation means forming the subject matter of the invention is indicated generally by the numeral 17 and is designed in the form illustrated for ready attachment to the case of the transmission 14 of a helicopter presently in use. The lift augmentation means comprises an auxiliary engine 18 with a low horsepower relative to the main propulsion engine, a generator 19, and supplemental transmission 20, the elements 17–20 constituting, in effect, an auxiliary power unit which may be mounted directly on the casing of the transmission 14. It is obvious that if the lift augmentation means is designed as a part of a newly designed helicopter, it could occupy any suitable position besides that shown. In the present instance it is attached to the transmission case at one of the power take-off pads. It is supported, in addition, by connection with the transmission casing, as at 21. It is obvious that other means of transmitting power from the auxiliary engine to the main transmission could be used; for example, hydraulic, pneumatic, or electrical linkage could be used in installations where it is undesirable or inconvenient to mechanically connect the auxiliary engine to the main transmission.

The assembly 17 also includes, as illustrated in FIG. 3, a clutch mechanism 22 disposed in the auxiliary power shaft 25 leading from the auxiliary engine to the transmission 14. Clutch 22 is selectively operated to connect the auxiliary engine and generator 19 with (and disconnect them from) the transmission 14. As shown in FIG. 3, a freewheeling clutch 23 is arranged between the transmission 14 and the main propulsion engine 16. The clutch 23 will disconnect the main propulsion engine from the transmission 14 whenever main engine speed is less than transmission speed. It may be desirable to incorporate a selectively operated clutch 23A between the main propulsion engine and the transmission to prevent the flow of torque from the main propulsion engine to the transmission and main rotor 12 in certain phases of the operation. For example, clutch 23A could be actuated to disconnect the main propulsion engine from the transmission during the starting of such engine. To effect a start of the main propulsion engine, it is provided with an electric motor or other suitable starting device 24. It will be obvious that after the main propulsion engine has been started, and clutch 23A properly actuated, freewheeling clutch 23 will transmit torque from the main propulsion engine to the transmission 14 to effect the operation of the main rotor 12. To prevent loading the auxiliary engine at this time with the main rotor, clutch 22 may be operated to interrupt motion transmission to the main rotor through the shaft 25. It is also within the scope of the invention to provide the auxiliary engine 18 with an overrunning clutch 26, which will function to permit shaft 25 to be driven by the main rotor transmission when it is desired to transmit rotary motion therefrom to the generator 19.

It will also be obvious that under certain circumstances, in addition to main engine starting, it may be desirable to operate clutch 22 to prevent the transmission of rotary motion from the auxiliary engine to the transmission 14 when it is desired to drive the generator 19. One such circumstance is the generation of current for operating or checking out electrically operated devices when the helicopter is not in general in use. In another circumstance, clutch 22 will also be operated to disconnect the auxiliary engine from the transmission 14 during the starting operation of the main engine. At this time, the auxiliary engine may be operated to drive the generator 19 and supply current for the operation of the starter 24. In conventional helicopters, batteries are supplied to provide current for this purpose. With the lift augmentation means, lower power batteries may be employed to provide starting power for the auxiliary engine and such batteries may be supplemented by the generator 19 when it is desired to start the main propulsion engine. It may also be possible to start the main propulsion engine with power from the generator alone.

As pointed out in the objects, the auxiliary engine has been provided to augment lift of the helicopter by the main rotor. This augmentation may be performed when the helicopter is taking off or at other times in different phases of operation. At such times, all clutches 22 23, 23A, and 26 are operative to connect the auxiliary and main propulsion engine, respectively, with the transmission 14.

In the event the main propulsion engine should become disabled for any reason during flight of the helicopter, clutch 23 will operate to disconnect the main propulsion engine from the transmission, at which time power will then be supplied by the auxiliary engine to the main rotor. This application of power will be insufficient to sustain the helicopter in flight but will be enough to reduce the rate of descent of the helicopter and increase the available landing area, as indicated in FIG. 4. During this time the auxiliary engine will also be operating the generator 19 to provide electrical power.

In addition to reducing the rate of descent of the helicopter during autorotation, the auxiliary engine may be used to increase the main rotor rpm and hence the kinetic energy stored in the rotor, which is available and necessary for braking the descent of the helicopter immediately prior to ground contact. This braking action is achieved by the pilot suddenly increasing the rotor blade angle attack (normally termed "collective pitch") immediately prior to ground contact. A further benefit of the use of the auxiliary engine during this terminal maneuver is to decrease the rate of rotor rpm decay as rotor kinetic energy is used, thus considerably increasing the stopping energy available to the pilot.

It should be noted that this final benefit of an auxiliary engine in boosting available rotor kinetic energy could be supplied by a short duration torque engine such as a propellant driven motor. However, the continuous benefit during the entire critical autorotation maneuver is available only from a continuously operating engine. Further, the degree of pilot skill in determining exactly when to "fire" the short duration engine is lessened with the choice of a long duration engine.

Should both engines at any time during flight become inoperative, clutch 23 may be operated to disconnect the main propulsion engine from the transmission and the main rotor will then drive, under autorotation, the generator 19. The overrunning clutch 26 will prevent the transmission of torque to the auxiliary engine at this time. Preferably, the auxiliary engine is of the gas turbine type, capable of operating completely independently of the main propulsion engine.

A safety feature resides in providing a shear section 27 in the shaft 25 between the clutch 22 and the main transmission. This shear section includes a weakened or other frangible portion which will fail in the event the generator or auxiliary engine should bind or otherwise offer excessive resistance to rotary movement imparted by the main propulsion engine. Should the shear section fail, the main propulsion engine can continue to drive the main rotor to sustain the helicopter in flight.

The advantages of the provision of the lift augmentation means may be summarized as follows: It provides a measure of lift power to expedite take-off or to assist in take-off with an overload. This lift power will also decrease during normal operation. It will also decrease the rate of descent under autorotation when the main engine is inoperative. The continuous torque provided to the main rotors by the auxiliary engine during the autorotation maneuver will increase the available kinetic energy of the rotors during the critical initial and terminal phases of the maneuver, and the benefits thereof are considerably greater than the mere reduction of rate of descent during power-off glide. It assists in providing electrical power for testing electrical equipment when the helicopter is on the ground and during main propulsion engine starting operation. It reduces the battery weight penalty by reducing the battery size equipment. It also provides for the generation of electrical power during autorotation when both engines are disabled. Other advantages will be apparent to those skilled in the art.

I claim:

1. In a helicopter of the type having a main rotor, a main propulsion engine, and a main transmission for transmitting driven power from said main propulsion engine to said main rotor, the transmission having a casing with at least one power take-off pad, the combination comprising:

(a) an auxiliary power unit connected with the power take-off pad of said transmission casing, said auxiliary power unit having an auxiliary engine with a low horsepower relative to the main propulsion engine, a generator, and a supplemental transmission operatively connecting said auxiliary engine and said generator;

(b) power transmission means connecting said auxiliary engine and said main transmission whereby said auxiliary engine is operative to drive said main rotor; and (c) clutch means between said main propulsion engine and said main rotor and between said main rotor and said auxiliary engine, said clutch means being selectively operative to connect either engine with said main rotor, to connect both engines with said main rotor and to disconnect both engines from said main rotor to provide for the simultaneous operation of said main and auxiliary engines while said main rotor is maintained in inactive condition, 2. The combination of claim 1 in which the auxiliary power unit is mounted on and supported by said main transmission casing.

3. The combination of claim 1 in which an electric starter motor is provided for starting said main propulsion engine, said auxiliary engine serving to drive said generator through said supplemental transmission to provide power for operating said starter motor to start said main propulsion engine while said clutch means is in condition to disconnect both engines from said main rotor.

4. The combination of claim 1 in which a one-way clutch is provided between said main propulsion engine and said main transmission and between said supplemental transmission and said auxiliary engine, said one-way clutches providing for the transmission of power from either engine to said main rotor and said generator and preventing the transmission of power from either engine to the other.

References Cited

UNITED STATES PATENTS

| | | |
|---|---|---|
| 979,003 | 12/1910 | Heany. |
| 2,979,968 | 4/1961 | Beurer _____ 170—135.75 X |
| 3,020,716 | 2/1962 | Greenly _____ 60—39.14 |
| 3,129,608 | 4/1964 | Watson. |
| 3,196,612 | 7/1965 | Laville et al. |
| 3,214,998 | 11/1965 | Hall _____ 74—661 |
| 3,290,963 | 12/1966 | Oldfield et al. _____ 74—661 X |
| 3,325,122 | 6/1967 | Young _____ 244—58 |

FOREIGN PATENTS 793,782  4/1958  Great Britain.

DONLEY J. STOCKING, Primary Examiner

THOMAS C. PERRY, Assistant Examiner

U.S. Cl. X.R.

170—135.75; 244—17.11, 58